United States Patent [19] … [11] 4,051,494
Fujita et al. … [45] Sept. 27, 1977

[54] PHOTOGRAPHIC CAMERA WITH BUILT-IN STROBO FLASH LIGHT DEVICE

[75] Inventors: Yoshihiro Fujita; Ikuo Fuutagawa; Katsuji Muramatsu, all of Tokyo, Japan

[73] Assignee: Fuji Photo Film Co., Ltd., Minami-ashigara, Japan

[21] Appl. No.: 612,947

[22] Filed: Sept. 12, 1975

[30] Foreign Application Priority Data

Sept. 13, 1974 Japan ............................ 49-105573

[51] Int. Cl.² ................................. G03B 15/03
[52] U.S. Cl. ............................. 354/145; 362/3
[58] Field of Search .............. 354/129, 145; 240/1.3, 240/1 R

[56] References Cited

U.S. PATENT DOCUMENTS

| | | | |
|---|---|---|---|
| 3,348,188 | 10/1967 | Wood | 240/1.3 X |
| 3,383,994 | 5/1968 | Bihlmaier | 354/145 X |
| 3,851,163 | 11/1974 | Stacy | 240/1.3 |
| 3,852,790 | 12/1974 | Robinson | 354/145 |
| 3,866,033 | 2/1975 | Stacy et al. | 240/1.3 |

FOREIGN PATENT DOCUMENTS

| | | | |
|---|---|---|---|
| 1,174,373 | 12/1969 | United Kingdom | 354/129 |
| 1,211,105 | 11/1970 | United Kingdom | 354/145 |

Primary Examiner—Donald A. Griffin

[57] ABSTRACT

In a photographic camera provided with a built-in strobo flash light device, the distance from the strobo flash tube to the optical axis of the taking lens of the camera is selected within the range of 4.5cm to 6.5cm. In order to prevent the red eye effect in color photography, the guide number of the strobo flash tube is selected within the range determined with respect to the distance from the strobo flash tube to the optical axis of the taking lens in accordance with the following formula;

$$GN < \frac{1}{0.37 - 0.73 (\tan^{-1}\frac{d}{400}/2.5°)}$$

where GN is the guide number of the strobo flash tube and $d$ is the distance from the flash tube to the optical axis of the taking lens.

2 Claims, 2 Drawing Figures

PHOTOGRAPHIC CAMERA WITH BUILT-IN STROBO FLASH LIGHT DEVICE

BACKGROUND OF THE INVENTION

1. Field of the Invention

This invention relates to a photographic camera with a built-in electronic flash light device, and more particularly to a photographic camera with a built-in electronic flash light device wherin a so-called red eye effect is prevented.

2. Description of the Prior Art

In order to facilitate the photographying in the dark by use of a flash light device such as an electronic flash light device (hereinafter referred to simply as "strobo"), it has been known to build a strobo in the camera body. The camera with a built-in strobo has a defect that eyes of the object are sometimes colored in red in the color photographs taken thereby. This is called red eye effect. The red eye effect is likely to appear when the illumination of the scene is low and the distance of the strobo or a flash bulb from the taking lens of a camera is small. Therefore, the red eye effect is apt to occur when a camera with a built-in strobo is used in the dark.

SUMMARY OF THE INVENTION

The primary object of the present invention is to provide a photographic camera with a built-in strobo wherein the red eye effect is prevented.

In order to prevent the red eye effect, the factors for causing the red eye effect have been researched by the present inventors. Consequently, the following four factors have been found to cause the red eye effect; low illumination of the scene, large quantity of light emitted by the strobo, short distance of the strobo from the optical axis of the taking lens of the camera and long distance of the eyes from the camera.

By repeated experiments, the present inventors found that the red eye effect could be prevented when the following formulae have been satisfied.

$$GN[0.73(1 - \theta/2.5°) - 0.12x] < 1 \quad (1)$$
$$0 < GN < 32, -2 \leq x \leq 10, 0.5° < \theta < 2.5°$$

where GN is the guide number indicative of the quantity of light emitted by the strobo determined in accordance with ISO-1230 (Photography-Determination of flash guide numbers), x is an index number indicative of the illumination of the scene which will be described in detail hereinafter, and $\theta$ is the angle formed between the optical axis of the taking lens of the camera and the line extending from the eye to the strobo.

The above formula (1) can be represented by the following formula by incorporating various practical factors in the formula (1), $$GN < \frac{1}{0.37 - 0.73(\tan^{-1}\frac{d}{400}/2.5°)} \quad (2)$$

where $d$ is the distance of the strobo from the taking lens of the camera.

The camera with a built-in strobo in accordance with the present invention is characterized in that the formula (2) is satisfied. Further, in the camera of the present invention, the distance of the strobo from the taking lens optical axis is set to be within the range of 4.5cm $\leq d \leq$ 6.5cm.

The camera with a built-in strobot in accordance with the present invention does not cause the red eye effect under almost all the normal conditions of flash light photographing.

DESCRIPTION OF THE PREFERRED EMBODIMENT

In order to prevent the red eye effect in the flash light photographying, the following formula has been established by repeated experiments by the present inventors.

$$GN[0.73(1 - \theta/2.5°) - 0.12x] < 1 \quad (1)$$

wherein $0 < GN < 32$, $-2 \leq x \leq 10$, $0.5° \leq \theta \leq 2.5$
where GN is the guide number of the strobo, x is an index number of the illumination of the scene and $\theta$ is the angle formed between the optical axis of the taking lens and the line extending from the eye to the strobo.

The guide number GN of the strobo is determined in accordance with the international standard ISO-1230 and represented by the formula;

$$GN = a\sqrt{Q \cdot S}$$

where Q is the total quantity of light emitted by the strobo, S is the sensitivity of the film and $a$ is a constant indicative of the reflecting efficiency of the reflector of the strobo. As the formula indicates, the guide number GN changes as the sensitivity of the film S changes even if the luminance of the strobo is constant. In the description of the present invention, the sensitivity of the film is assumed to be ASA100. When the film of ASA400 is used, the guide number GN is doubled.

The index number x indicative of the illumination of the scene has a following relationship with the unit lux E(x). The lux E(x) is a function of the index number x represented as follows;

$$E(x) = 10.76 \times 2^{x-1} (\text{lux}).$$

For instance, when $x=1$, E(1) is 5.38 lux, and when $x=4$, E(4) is 43.04 lux.

Figure 1:
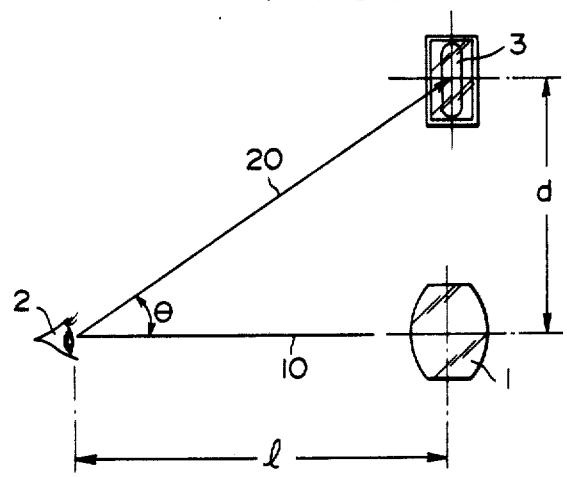
FIG. 1 is a schematic explanatory side view showing the angle $\theta$ formed by the optical axis of the taking lens of the camera and the line extending from the eye of the object to the strobo.

The angle $\theta$ is the angle formed between the optical axis 10 of the taking lens 1 and the line 20 extending from the eye 2 to the strobo tube 3 of the strobo flash light device in the camera body as shown in FIG. 1. The angle $\theta$ is, therefore, determined by the distance $l$ of the eye 2 from the taking lens 1 of the camera and the distance $d$ of the strobo tube 3 from the taking lens 1.

The formula (1) indicates that the red eye effect can be prevented if the formula is satisfied. For instance, when the guide number GN is 8, the index number of the scene illumination x is 2 and the angle $\theta$ is 0.78° (where the distance $l$ of the eye 2 from the taking lens 1 is 4m and the distance $d$ of the strobo 3 from the taking lens 1 is 5.5 cm), the formula (1) is not satisfied since the left side thereof becomes larger than the right side as follows and accordingly the red eye effect occurs.

$$GN [0.73 (1 - \theta/2.5°) - 0.12x] + 2.0 > 1$$

When the guide number GN is 16, $x$ is 4 and $\theta$ is 2°, the left side of the formula (1) becomes $$GN [0.73 (1 - \theta/2.5°) - 0.12 \times] + -5.3 < 1$$

and accordingly the red eye effect does not occur.

The above formula (1) is concerned with three variables GN, $x$ and $\theta$, and accordingly, it is difficult in practical sense to prevent the red eye effect by selecting these three variables. Therefore, it is desirable to simplify the above formula (1) by taking various practical conditions into account.

According to the statistical data, the distance from the object to the camera is usually not longer than 4m and the scene brightness is usually not lower than 3 in terms of said index number x when a strobo is used. More exactly, over 90% of photos are taken at the distance of not longer than 4m and over 98% of photos are taken under the illumination of not lower than x=3. By introducing $x=3$ and $\theta = \tan^{-1} d/l = \tan^{-1} d/400$ in the formula (1), the following formula is obtained;

$$GN < \frac{1}{0.73 - 0.73(\frac{\tan^{-1}\frac{d}{400}}{2.5°}) - 0.12 \times 3}$$

which can be represented as follows;

$$GN < \frac{1}{0.37 - 0.73(\frac{\tan^{-1}\frac{d}{400}}{2.5°})} \quad (2)$$

wherein $d$ is the distance from the optical axis of the taking lens of the camera to the center of the strobo tube as mentioned hereinbefore.

The above formula (2) therefore indicates that the red eye effect does not occur when the left side thereof is smaller than the right side thereof under the conditions that the scene brightness is not lower than $x=3$ and the distance of the object is not longer than 4m. In the practical cameras, the distance d from the optical axis of the taking lens to the center of the strobo tube should preferably be within the range of 4.5cm to 6.5cm from the viewpoint of the design and portability of cameras.

Figure 2:
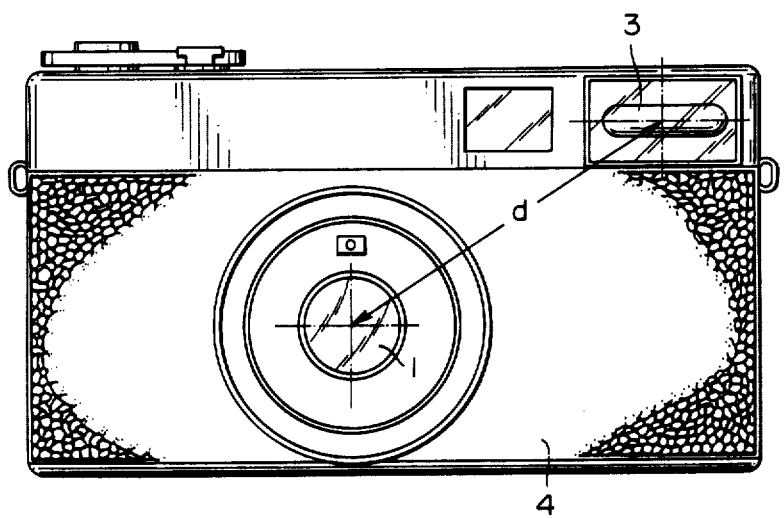
FIG. 2 is a front view showing the camera with a built-in strobo in accordance with an embodiment of the present invention.

Referring to FIG. 2 which shows an embodiment of the camera with a built-in strobo in accordance with the present invention, a strobo tube 3 is located at the distance $d$ from the optical axis of the taking lens 1 of the camera 4. The distance $d$ is selected to be within said range of 4.5cm to 6.5cm, and the guide number GN of the strobo 3 is selected to satisfy said formula (2).

For instance, when the distance $d$ is 6.5cm, the guide number GN of the strobo 3 is selected to be less than 10. When this camera is used for taking a picture in the dark of $x \geq 3$ at the distance of $l \leq 4m$ by use of the strobo flash light, the red eye effect does not occur. If the distance $l$ of the object is longer than 4m, the red eye effect appears. However, when the picture is taken on the ordinary 35mm film by use of the ordinary lens having the focal length of 38mm and the film image is printed on the normal size of paper (the film image is enlarged three times), the size of the iris of eyes on the printed paper becomes as small as 0.2mm since the maximum size of the iris is about 8mm. Therefore, even if the red eye effect occurs, it is not recognized on the paper in such a case. Thus, the red eye effect does not occur under the normal conditions when the camera in accordance with this embodiment is used.

When the distance $d$ is 4.5cm, the guide number GN of the strobo 3 is selected to be less than 5.2 to satisfy said formula (2).

The upper limit of the guide number GN of the strobo 3 is automatically determined by the formula (2) if the distance $d$ is determined.

The lower limit of the guide number GN of the strobo 3 is not determined by the formula (2), and accordingly, there is no lower limit in the guide number GN to prevent the red eye effect. However, from the practical viewpoint, it is desirable that the guide number GN be not lower than 3.6 in view of the aperture size or F-number of the lens which is usually about 1.2 and the distance of the object which is usually longer than 3m.

We claim:

1. A photographic camera with a built-in strobo flash light device comprising a camera body having a taking lens on the front face thereof and a strobo flash tube provided on the front face of the camera body wherein in order to minimize the occurrence of a so-called "red-eye phenomenon" the distance from the center of the strobo flash tube to the optical axis of the taking lens is within the range of 4.5cm to 6.5cm, and that the guide number of the strobo flash tube is selected to satisfy the following formula;

$$GN < \frac{1}{0.37 - 0.73 (\tan^{-1}\frac{d}{400} /2.5°)}$$

where GN is the guide number and $d$ is the distance from the center of the strobo flash tube to the optical axis of the taking lens.

2. A photographic camera with a built-in strobo flash light device as claimed in claim 1 wherein said guide number GN is not less than 3.6.

* * * * *